(No Model.)
J. K. PATTERSON.
ICE CREAM FREEZER.
No. 504,363.   Patented Sept. 5, 1893.
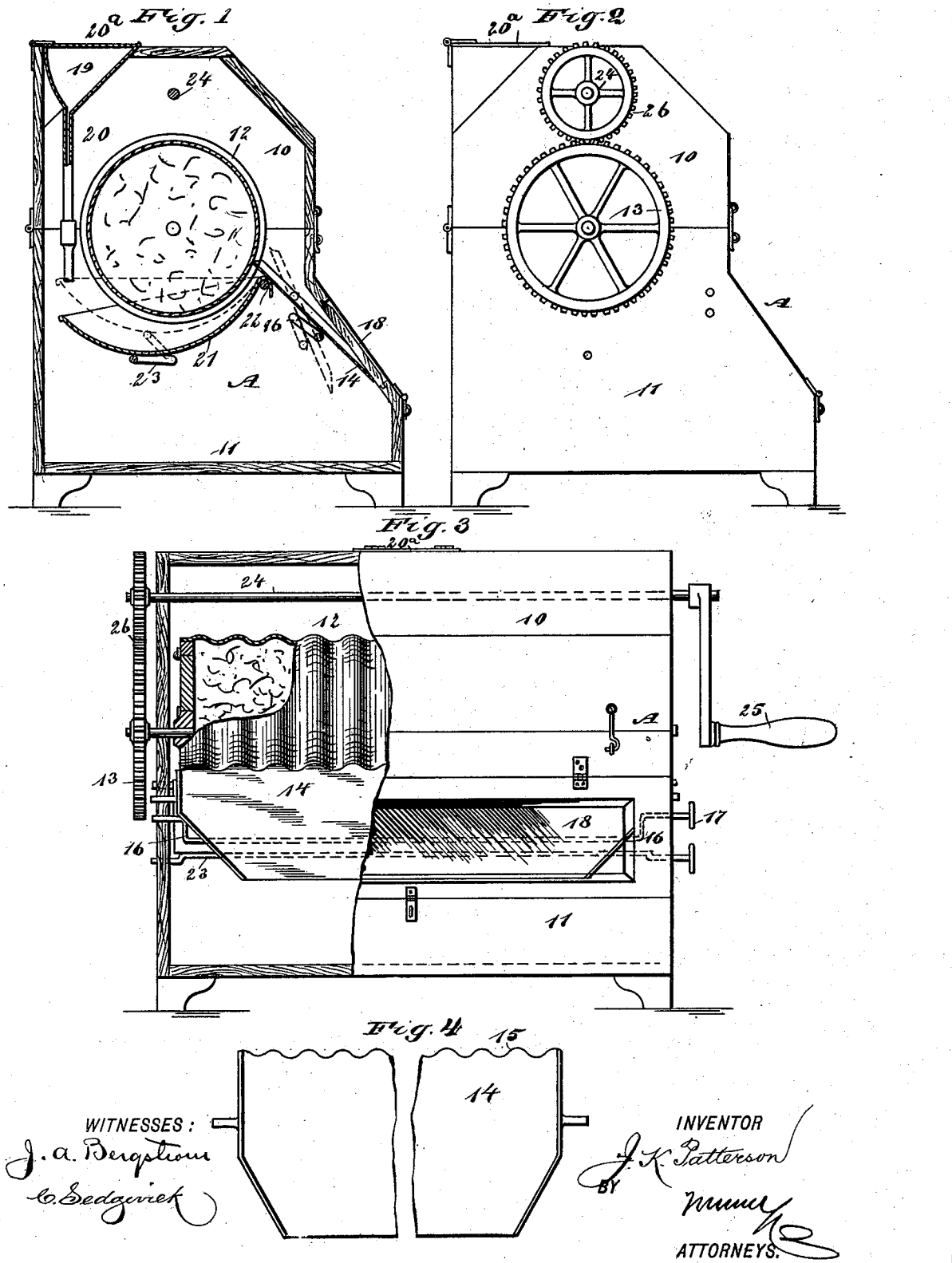

UNITED STATES PATENT OFFICE.

JAMES K. PATTERSON, OF CRETE, NEBRASKA.

ICE-CREAM FREEZER.

SPECIFICATION forming part of Letters Patent No. 504,363, dated September 5, 1893.

Application filed March 26, 1892. Serial No. 426,551. (No model.)

*To all whom it may concern:*

Be it known that I, JAMES K. PATTERSON, of Crete, in the county of Saline and State of Nebraska, have invented a new and Improved Ice-Cream Freezer, of which the following is a full, clear, and exact description.

My invention relates to an improvement in ice cream freezers, and has for its object to provide a device which will be portable, simple and durable as well as economic, and capable of being conveniently manipulated, and the invention consists in the novel construction and combination of the several parts, as will be hereinafter fully set forth and pointed out in the claim.

Reference is to be had to the accompanying drawings forming a part of this specification, in which similar letters and figures of reference indicate corresponding parts in all the views.

Figure 1 is a transverse vertical section through the freezer. Fig. 2 is an end view. Fig. 3 is a front elevation of the machine, portions being broken away; and Fig. 4 is a broken plan view of the delivery chute of the machine.

The case A of the freezer is a box-like structure divided into an upper section 10 and a lower section 11, the sections being connected at the back by hinges of any approved construction. In the upper edges of the lower case section 11 the trunnions, axle or shaft of a hollow drum or cylinder 12, are journaled, one trunnion having attached thereto a driving gear 13. Upon the peripheral surface of this drum or cylinder the cream is to be frozen, and the refrigerating material is inserted in the drum at one end after it has been lifted from its bearings, or an opening for that purpose may be provided in the case and normally concealed by a cover. The peripheral surface of the drum or cylinder is corrugated, as shown in Fig. 3, thereby strengthening it and providing a maximum surface for the cream to freeze upon. Below and in front of the drum a chute 14, is located. This chute at or near its inner or rear end is fulcrumed in the ends of the case, as shown in Fig. 3, and the forward or outer end of the chute is preferably made more contracted than its rear end. The chute at its rear end extends practically from end to end of the cylinder, and acts in the capacity of a scraper, removing the frozen cream from the cylinder. To that end the rear scraper surface of the chute is undulating or scalloped, as shown at 15, to neatly fit the exterior fluted surface of the cylinder. Normally the scraper surface of the chute is out of engagement with the cylinder, as shown in dotted lines, Fig. 1, but it may be thrown into engagement therewith at any time through the medium of a crank shaft 16, or the equivalent thereof. When the crank shaft is employed it is journaled in the ends of the case, and the crank arm of the shaft serves as a rest or support for the chute below its fulcrum.

The crank shaft is provided at one end with a handle 17, and it is evident that when the crank arm is carried forward and upward the outer end of the chute will be taken in the same direction and the inner end will be carried downward and in contact with the cylinder. The main portion of the lower case section is beveled, and at the beveled face a glass door 18, is located. The door serves to keep out hot air, dust, &c., and enables the operator to note the operation of the machine at all times.

In the upper central portion of the case a hopper 19, is located, adapted to receive the liquid cream, which hopper is provided at its lower end with a tube 20, the said tube being adapted to extend downward back of the cylinder within the lower section of the box body. The hopper is likewise provided at the top with a hinged cover 20ª. The hopper empties its contents in a tilting pan or receptacle 21, located within the lower section of the box body, beneath the cylinder. The pan is removable and its forward edge is shaped to fit over and rest upon a rod 22 extending from end to end of the casing in front of the lower portion of the cylinder and below the chute 14 when said chute is in position for removing cream from the cylinder. The rear portion of the pan or receptacle 21, is supported by a crank shaft 23, or like device, as is best illustrated in Figs. 1 and 3. One end of the crank shaft extends through the case and terminates in a handle whereby the shaft may be manipulated, and it is evident that by moving the crank shaft in one direction the pan may be lifted, as shown in dotted lines in Fig. 1, in such a manner as to bring its contents in contact with the cylinder. The forward end of the pan or receptacle may be utilized as a stop for the downward movement of the upper end of the chute 14. It may be here stated that by corrugating the freezing cylinder not only is the cylinder strengthened and a maximum of freezing surface obtained, but the frozen cream when scraped therefrom will leave it broken or in flakes instead of in large pieces, as would be the case if the periphery of the cylinder were perfectly plain. The cylinder is rotated through the medium of a shaft 24, located in the upper section of the case and provided at one end with a crank 25, whereby it may be operated by hand, and having attached at its outer end a pinion 26, meshing with the driving gear 13 of the cylinder 12.

In operation, the refrigerating compound having been placed in the cylinder and cream in the hopper, when the receiving pan has been supplied with a proper amount of cream the cylinder is revolved and the pan containing the cream and located below the cylinder is raised until the cylinder revolves in the cream, and as soon as the cream is deposited upon the cylinder it is crystallized, and removed by the scraper end of the chute which is brought into engagement with the cylinder.

Having thus described my invention, I claim as new and desire to secure by Letters Patent—

The combination with the freezing cylinder, of a pivoted scraper at one side of the cylinder, a cream pan below the cylinder, pivoted at one end adjacent to the cylinder, and arranged eccentrically with respect to the cylinder to project beyond the same at its free end, and a hopper having a vertical spout delivering to such projected end, the scraper being pivoted independent of the cream pan, and resting when in its normal position on the pivoted end of the pan, substantially as described.

JAMES K. PATTERSON.

Witnesses:
FRED M. YOUNG,
GEO. D. STEVENS.